(No Model.)
J. & J. MILLS.
CART.
No. 297,830. Patented Apr. 29, 1884.
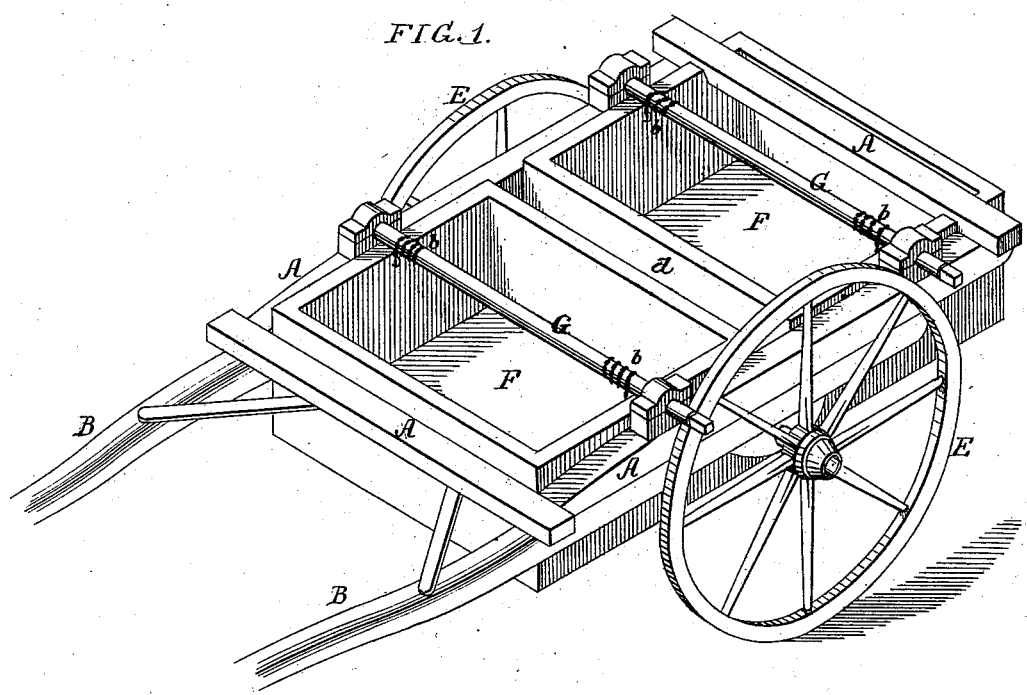
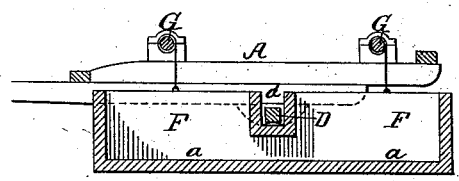
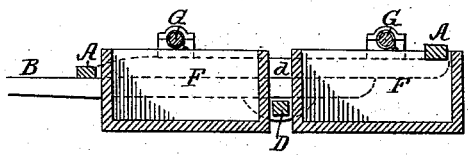
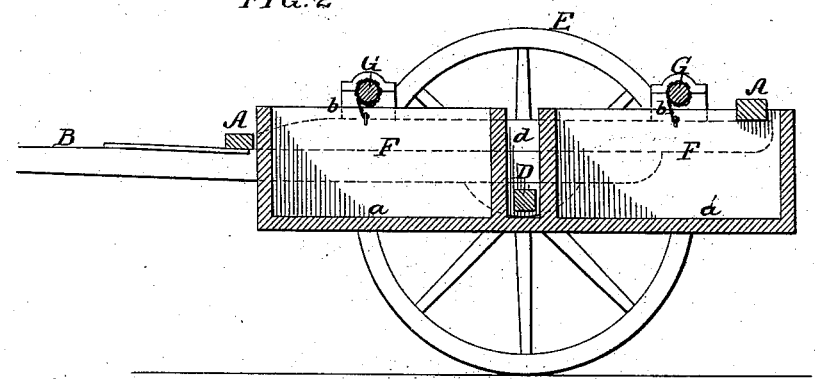

UNITED STATES PATENT OFFICE.

JOHN MILLS AND JAMES MILLS, OF WILMINGTON, DELAWARE.

CART.

SPECIFICATION forming part of Letters Patent No. 297,830, dated April 29, 1884.

Application filed February 18, 1884. (No model.)

*To all whom it may concern:*

Be it known that we, JOHN MILLS and JAMES MILLS, citizens of the United States, and residents of Wilmington, Delaware, have invented certain Improvements in Carts, of which the following is a specification.

Our invention consists of certain improvements in carts for transporting bricks, the main object of our invention being to dispense with the costly arched axle usual in carts of this class, and a further object being to brace and steady the body of the cart. These objects we attain in the manner which we will now proceed to describe, reference being had to the accompanying drawings, in which—

Figure 1 is a perspective view of a cart made in accordance with our invention, Fig. 2, a longitudinal section of the same, and Figs. 3 and 4 views illustrating modified forms of the cart.

In Figs. 1 and 2, A represents the frame of the cart, which has shafts B, and is provided with an axle, D, having wheels E outside the frame. The body of the cart comprises the two receptacles, F F, which, as shown, form part of one structure, the bottom $a$ being common to both receptacles. On the frame A are bearings for two winding-shafts, G G, from which the body of the cart is suspended by cords or chains $b$, the lower ends of which are connected to the receptacles F, so as to be readily detached therefrom. The receptacles are filled with bricks while resting upon the ground or other support, and the frame of the cart is adjusted so that the axle is directly above and parallel with the space $d$ between the two receptacles F. The cords or chains $b$ are then attached to the receptacles, and the shafts G turned so as to wind up said chains and elevate the body of the cart to the position shown in Fig. 2, the axle occupying the space $d$. The body of the cart occupies this position while being drawn to its destination, and is effectually braced and prevented from swaying in either direction by the axle and by the frame A, within which the body fits snugly. When the cart reaches its destination, the body is lowered and the cords or chains $b$ detached therefrom, so that the wheeled frame is at liberty to return for another load.

By making the body in the form of two receptacles, one in advance of the axle and the other in the rear of the same, we are enabled to dispense with the arched axle usual in carts of this class, and thus considerably cheapen the same, besides producing a stronger and more effectively stayed vehicle.

The idea of the double receptacle may be carried out in different ways. For instance, in Fig. 3 we have shown a cart in which the two receptacles are independent of each other, each being hung to one of the shafts G, and in Fig. 4 we have shown another form of cart, in which the space $d$ is not as deep as in the other carts illustrated, there being a communication between the two receptacles beneath the said space.

We do not desire to restrict ourselves to any special form of elevating mechanism, as this may be varied to suit circumstances, and the body, when elevated, may be supported by hooks on the frame A, so as to relieve the strain on the cords or chains $b$.

In some cases the receptacle F may be furnished with pivoted or sliding bottoms, so as to permit the dumping of the contents of said receptacles, the cart in such case being adapted for carrying common as well as fine bricks.

By the use of two receptacles, with the intervening space for the axle, the body of the cart is caused to occupy a position which is a medium between an ordinary cart having the body above the axle and a cart having the body wholly beneath the axle—a construction which is advisable for many purposes.

We claim as our invention—

1. A brick-cart in which a frame, A, with its axle and wheels, is combined with two receptacles, F, one in advance and the other in the rear of the axle, all substantially as set forth.

2. A brick-cart in which a frame, A, with its axle and wheels, is combined with two receptacles, F, one in advance and the other in the rear of the axle, and with mechanism for raising and lowering said receptacles, all substantially as set forth.

3. The combination of the frame A, having an axle and wheels, and the body comprising two receptacles, F, with intervening space, $d$, for the reception of the axle, as set forth.

4. The combination of the frame A, having an axle and wheels, the body comprising two receptacles, F, with intervening space, $d$, for the reception of the axle, and mechanism for raising and lowering said body, as set forth.

In testimony whereof we have signed our names to this specification in the presence of two subscribing witnesses.

JOHN MILLS.
JAMES MILLS.

Witnesses:
WM. W. PRITCHETT,
CHAS. SIMMONS.